US006354714B1

(12) United States Patent
Rhodes

(10) Patent No.: US 6,354,714 B1
(45) Date of Patent: Mar. 12, 2002

(54) EMBEDDED LED LIGHTING SYSTEM

(76) Inventor: Michael Rhodes, 604 SE. 2nd Ave., Grand Rapids, MN (US) 55744

( * ) Notice: Subject to any disclaimer, the term of this patent is extended or adjusted under 35 U.S.C. 154(b) by 0 days.

(21) Appl. No.: 09/692,464

(22) Filed: Oct. 20, 2000

Related U.S. Application Data

(60) Provisional application No. 60/194,371, filed on Apr. 4, 2000.

(51) Int. Cl.[7] .............................................. F21V 23/00
(52) U.S. Cl. ..................... 362/153.1; 362/152; 362/249; 362/362; 362/145
(58) Field of Search ................................ 362/240, 249, 362/362, 145, 152, 153.1; 313/500, 512

(56) References Cited

U.S. PATENT DOCUMENTS

| | | | |
|---|---|---|---|
| 3,663,808 A | 5/1972 | Baatz | 240/2 |
| 4,993,868 A | 2/1991 | Eigenmann | 404/12 |
| 5,160,202 A | 11/1992 | Legare | 362/153.1 |
| 5,438,495 A | 8/1995 | Ahlen et al. | 362/153.1 |
| 5,450,300 A | 9/1995 | Rector, Jr. | 362/153.1 |
| 5,669,691 A | 9/1997 | Barrow | 362/153.1 |
| 5,927,845 A | * 7/1999 | Gustafson et al. | 362/152 |
| 6,142,647 A | * 11/2000 | Hayakawa | 362/230 |
| 6,158,882 A | * 12/2000 | Bischoff, Jr. | 362/488 |
| 6,234,647 B1 | * 5/2001 | Liu | 362/235 |
| 6,244,728 B1 | * 6/2001 | Cote et al. | 362/249 |
| 6,286,978 B1 | * 9/2001 | Tait et al. | 362/249 |

* cited by examiner

*Primary Examiner*—Sandra O'Shea
*Assistant Examiner*—Anabel Ton
(74) *Attorney, Agent, or Firm*—Richard C. Litman

(57) ABSTRACT

An embedded LED lighting system for marking flooring, walkways, roadways, and airport runways employs a strip of light emitting diode mounted on a I-beam shaped framework and encapsulated in a clear or reflective potting material. The upper portion of the housing for the LED lighting system is covered with a reflective coating or tape. The embedded LED lighting system can be controlled by motion sensors, pressure sensors, or crosswalk lights.

16 Claims, 4 Drawing Sheets

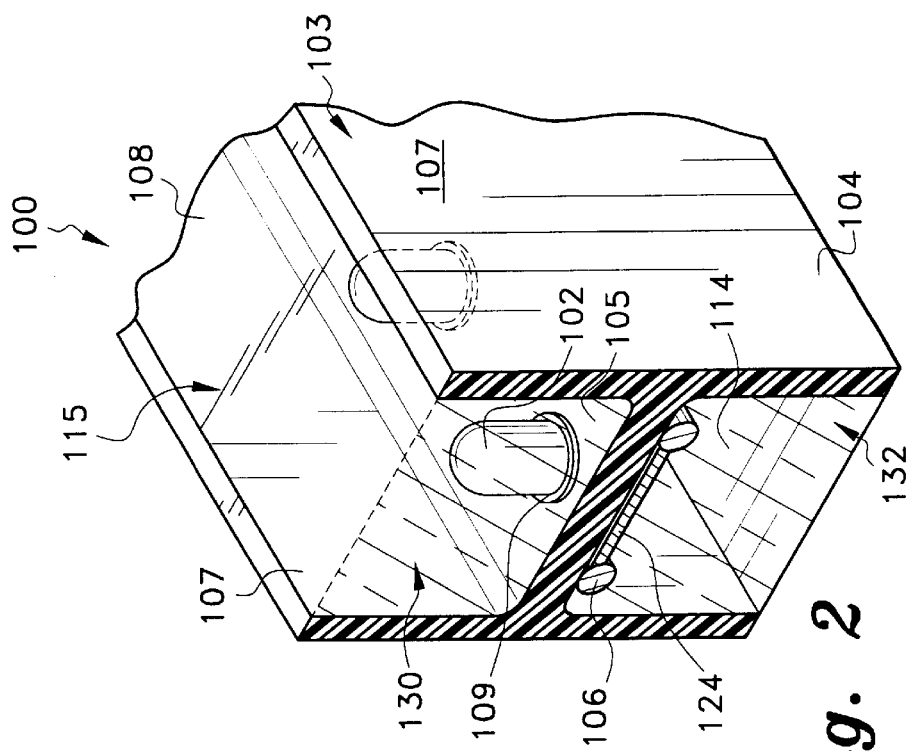
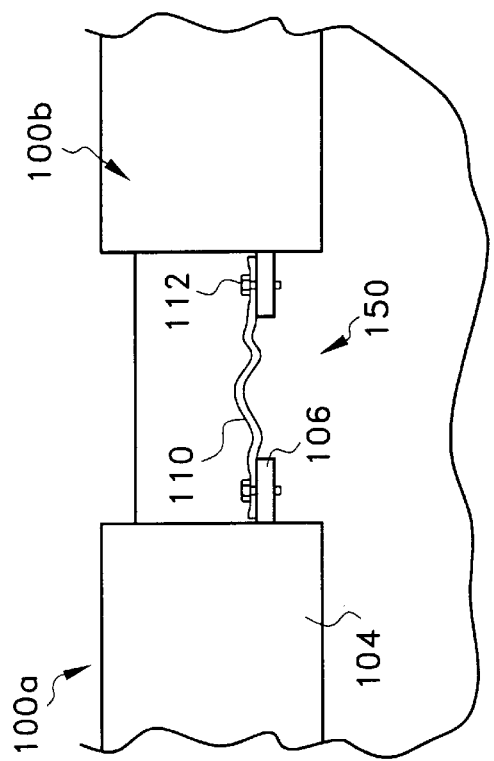

EMBEDDED LED LIGHTING SYSTEM

CROSS-REFERENCE TO RELATED APPLICATION

This application claims the benefit of U.S. Provisional Patent Application Serial No. 60/194,371, filed Apr. 4, 2000.

BACKGROUND OF THE INVENTION

1. Field of the Invention

The present invention relates generally to lighting systems and more particularly, to an embedded LED lighting system that is well-suited for marking walkways, roadways, or airport runways. The embedded LED lighting system can be controlled by radio frequency controllers, motion sensors, photocells, etc.

2. Description of Related Art

Properly illuminating roadways, airport runways, or crosswalks at night is essential to maintaining a safe and accident free environment. Some locations such as airports often require that illumination sources be highly visible even during the day, for example, runway stop line lights. However, it is difficult to find an illuminating means that is durable, relatively easy to install and remove, that is cost efficient, and easy to repair and maintain. Also such an illuminating means would have to provide excellent illumination without posing a threat as a physical obstacle to pedestrians and vehicular traffic.

The prior art describes a variety of lighting systems used to provide illumination for different settings. For example, an illuminated safety curbing is described in U.S. Pat. No. 3,663,808, issued on May 16, 1972 to W. Baatz. The construction of the illuminated safety curbing employs a reinforced, pre-cast concrete base with an extra heavy-duty translucent fiberglass cover of diving bell configuration which houses an incandescent or fluorescent illumination fixture. Single-faced or double-faced elongated illuminated curbing sections are adapted to be combined in various configurations with a nose section to form curbings and dividers for different traffic separator situations.

U.S. Pat. No. 4,993,868, issued on Feb. 19, 1991 to L. Eigenmann, describes a continuous horizontal road-marking tape. The road marking tape includes light emitting diodes or high intensity microlamps, solar cells, and retroreflecting elements. The road marking tape balances the solar energy captured by its solar cells with the emitted light employed to signal or warn motorists.

U.S. Pat. No. 5,160,202, issued on Nov. 3, 1992 to L. R. Legare, describes an illuminated concrete curbstone. The curbstone is adapted to be partly immersed in the ground adjacent a driveway. The concrete curbstone block has an internal illuminated housing for projecting light onto a driveway. The housing has a transparent window receding from the flat front face of concrete. The illuminated curbstone is adapted to project light onto the driveway at a level above the ground.

An embedded light fitting for runways is described in U.S. Pat. No. 5,438,495, issued on Aug. 1, 1995 to H. Ahlen et al. The light fitting, which includes a light source with a reflector as well as a limiting light opening in the field of light, is intended to be embedded in the surfacing of a runway.

A device for providing light along a runway or taxiway at an airport is described in U.S. Pat. No. 5,450,300, issued on Sep. 12, 1995 to J. A. Rector, Jr. A base receptacle is adapted to be positioned along the runway and has an open end and a sleeve member that has a sleeve member passageway allowing access through the open end into the base receptacle. A replaceable light fixture connecting apparatus is used to connect a light fixture to the sleeve member.

U.S. Pat. No. 5,669,691, issued on Sep. 23, 1997 to F. R. Barrow, describes an airport runway or taxiway light fixture. The in-pavement light fixture for mounting in an airport runway or a taxiway has a cover with a flat surface and one or two windows for the passage of a light beam. An optical prism is detachably mounted in a cavity formed in the cover beside and beneath each window.

An integrally formed linear light strip with light emitting diodes is described in U.S. Pat. No. 5,927,845, issued on Jul. 27, 1999 to T. L. Gustafson. The light strip includes first and second bus elements spaced apart from one another by a predetermined distance. An extruded plastic material completely encapsulates the first and second bus elements and the LED, thereby providing a barrier to protect the elements from damage and to make the light strip impervious to moisture.

None of the above inventions and patents, taken either singly or in combination, is seen to describe the instant invention as claimed.

SUMMARY OF THE INVENTION

Accordingly, it is a principal object of the invention to provide an LED lighting system that can be embedded into a concrete, asphalt or flooring surface.

It is another object of the invention to provide an embedable LED lighting system that serves as an excellent source of illumination.

It is a further object of the invention to provide an embedable LED lighting system that is not potentially a physical obstacle to pedestrian and vehicular traffic.

Still another object of the invention is to provide an embedable LED lighting system that is easy to maintain and readily serviceable.

It is an object of the invention to provide improved elements and arrangements thereof in an embedded LED lighting system for the purposes described which is inexpensive, dependable and fully effective in accomplishing its intended purposes.

The foregoing objectives are achieved in accordance with the present invention by providing a LED lighting system that is embedded in a concrete, asphalt, or flooring surface. The embedable LED lighting system of the present invention is an excellent source of illumination and does not pose a threat as a physical obstacle to pedestrian and vehicular traffic. The LED lighting system comprises a strip of light emitting diodes mounted in an extruded I-beam configured framework and encapsulated in a clear and reflective lens material. The embedded LED lighting system of the present invention produces uniform illumination that is highly visible.

The embedded LED lighting system of the present invention can be used in a broad spectrum of applications; for example, the LED lighting system can be used for marking roadways or restricted areas and airline logos at airports. The LED lighting system can be controlled by motion sensors, pressure sensors, or radio frequency controllers. Furthermore, the lighting system can be an arrangement to produce any desired illuminating configuration such as an arrow, numeric character, or lines meeting the color and size of federal and state safety markings.

These and other objects of the present invention will become readily apparent upon further review of the following specification and drawings.

BRIEF DESCRIPTION OF THE DRAWINGS

FIG. 2 is a perspective view of an embedable LED light in its housing.

FIG. 3 is a side view of two connected embedable LED lighting units.

Similar reference characters denote corresponding features consistently throughout the attached drawings.

DETAILED DESCRIPTION OF THE PREFERRED EMBODIMENTS

Figure 1:
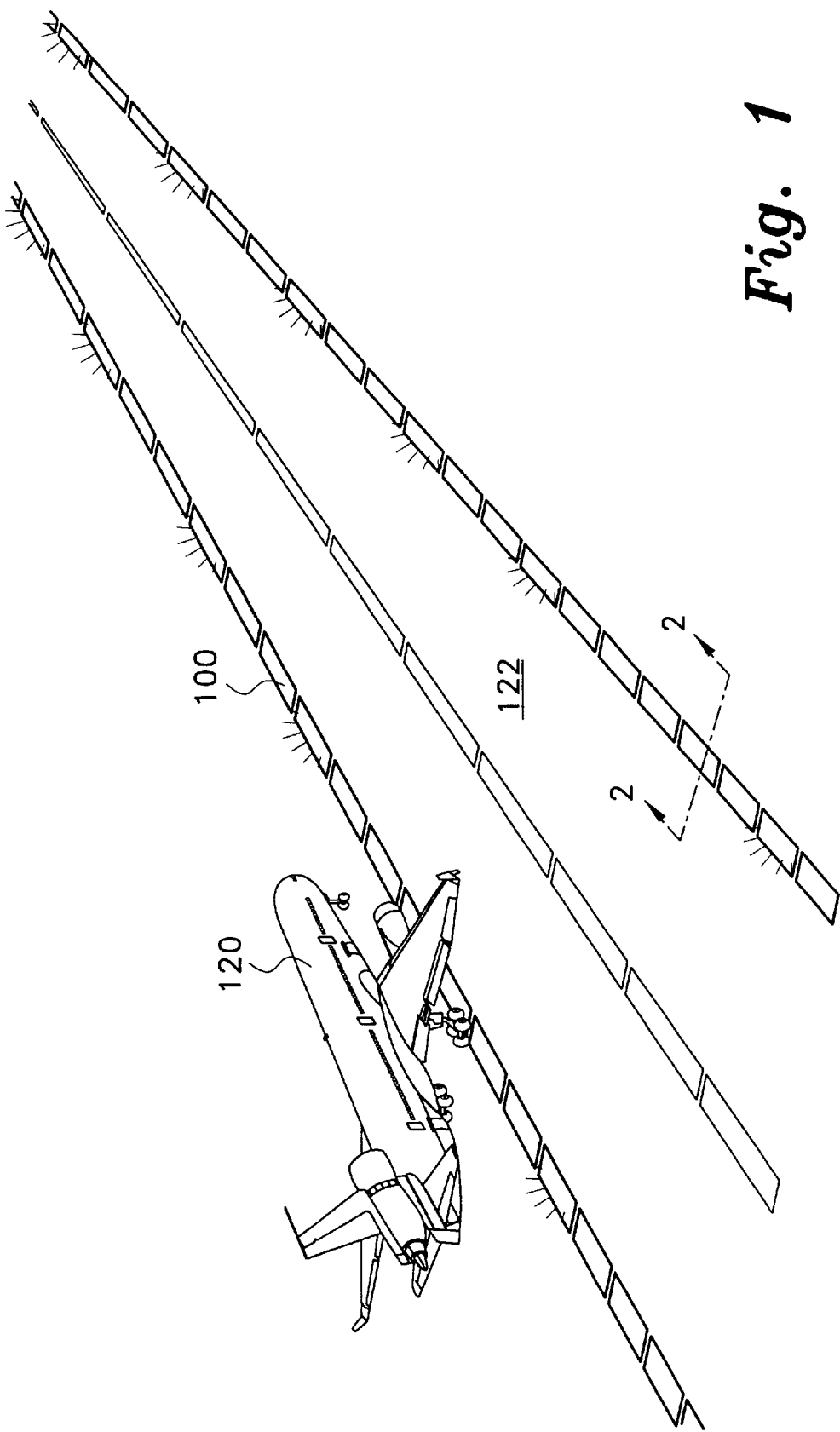
FIG. 1 is an environmental view of embedded LED lighting installed on an airport runway according to the present invention.

The present invention, as depicted in FIGS. 1–4, is an embedable LED lighting unit 100 that can be used in a plethora of applications, for example, marking walkways, roadways, logos and restricted areas inside and outside at airport terminals. FIG. 1 is an environmental view of the embedded LED lighting 100 installed on an airport runway 122 to provide runway lights 100 for airplanes 120 taking off and landing. The embedable LED lighting units 100 of the present invention can be arranged in a multitude of configurations for a wide variety of applications. For example, the embedable LED lighting units 100 could be arranged in a linear manner, as shown in FIG. 1, or in a circular manner. The embedable LED lighting units 100 can be configured to form dots, arrows, or alphanumeric characters.

The embedable LED lighting units 100 can be controlled (turned OFF and ON) by a broad spectrum of controllers, for example, a radio frequency controller, motion sensors, photocells, flashers, pressure sensors, or crosswalk lights.

A large airport provides an excellent example to demonstrate the utility and versatility of the embedable LED lighting system 100 of the present invention. When a airplane 120 has landed, the control tower may instruct the pilot of the airplane 120 to take the green lighted taxi runway to park in the yellow lighted parking space, or when an airplane 120 is on the ground, the airplane 120 may pass a series of motion sensors that are used to turn on the directional lighting which guides the pilot to the parking or loading area. Once the airplane 120 leaves the designated area another series of motion sensors may turn off the embedded LED lighting 100.

Another application for the embedded LED lights 100 of the present invention is the illumination of a hazardous corner or intersection, or the illumination of caution road bumps to warn drivers of the potential danger. To increase public safety at a dangerous intersection, two embedded LED lighting strips 100 could be used to coincide with the crosswalk marking. For example, the embedded LED lighting 100 would consist of green, yellow, and red LED strips built into a single lighting strip. When the traffic light is green, the crossing embedded LED strip is red, and when the traffic light is red, the crossing embedded LED strip is green. Thus, the pedestrian embedded LED lighting 100 tells the pedestrian the color of the traffic light. Therefore, a pedestrian is not precariously looking up at a traffic light while trying to watch his step as he steps down from the curb.

Another application of the invention would be the illumination of floor tiling in specific arrangements, inside and even outside airport terminals, directing passengers to departure gates (for example), and/or the use of an embedded LED scrolling marquee, informing passengers of departure times, and/or providing specific instructions.

In another application, the embedable LED lights 100 are used to illuminate floor tiles inside an airport terminal that are arranged to direct passengers to departure gates or the embedded LED lights 100 are used to create an embedded LED scrolling marquee that informs passengers of departure times or any other specific instructions.

FIG. 2 is a perspective view of an embedable LED light 100 in a housing 104. The embedded LED lighting 100 is powered by a 5 volt power supply (not shown) which gives the embedded LED lighting a long life (approximately 10 years); however, other suitable electrical power sources can be used. The light emitting diodes 102 provide a high quality, high intensity (MCD's) illumination. The housing 104 has an extruded I-beam configuration 103 including a web 105 and parallel flanges 107, the sides of I-beam 103 being enclosed by a first clear or reflective potting material 108 extending between the flanges 107 on one side of the web 105, and by a second potting material 114 extending between the flanges 104 on the opposite side of the web 105.

The I beam housing can be extruded to accommodate differing mounting requirements, such as employing a lip off of the top of the parallel flanges for recessed bolts, to bolt the housing to the concrete, or using the configuration of housing 104 to mount by means of an adhesive. In the tile floor application, the I beam configuration could be replaced by the circuit board for the web, with surface-mounted LEDs to condense the light 100 height. A factory mold would be used for the molding of the potting material 108.

The embedded LED lighting 100 has a strip of light emitting diodes 102 that extend through openings 109 in the web 105. Light emitting diodes 102 extend longitudinally along the length of the web 105. The exact number of light emitting diodes 102 extending along the length and width of the web 105 is determined by the specific application for which the embedded LED lighting unit 100 is used.

The light emitting diodes 102 and the underlying circuit board 124 are encased in the clear or reflective or colored material 108,114. The extruded framework or I-beam 103 defines channels 130,132 in which the light emitting diodes 102, circuit board 124, and the conductive bus bars 106 are disposed. The clear, reflective, or colored potting material 108 functions as a lens and enhances the effectiveness of the embedded LED lighting 100. The light emitting diode head or bulb 102 protrudes into the channel 130 as shown in FIG. 2. The channel 132 contains the LED resistors on a printed circuit board 124, to which the leads of the LEDs 102 and conductive bus bars 106 are also attached.

Both channel cavities 130,132 of the extruded I-beam 103 are filled with a special clear or reflective or colored potting material 108,114 (for example, a polymer) that seals the components 102,106,124 in the channel cavities 130,132 and protects the components 102,106,124 from water and corrosion. The potting material 108,114 can be made of a durable yet moderately flexible composition to allow the embedded LED lighting 100 to move with the ground movement in asphalt and/or minor cracks in concrete 118. Prior to filling the upper channel cavity 130 with the clear, reflective or colored potting material 108, the interior sides of the upper channel cavity 130 are covered with a reflective coating to enhance the illumination properties of the embedded LED lighting 100. In an alternate embodiment, the interior sides of the upper channel cavity 130 are covered with a reflective tape prior to filling the upper channel cavity 130 with clear potting material 108.

Some applications such as embedded runway lights 100 for airports (see FIG. 5) require the use of a tempered glass top layer 172 covering the surface 115 of the clear potting material 108. The tempered glass surface 172 is scratch resistant. In applications that require a glass top layer 172 and in which safety issues pertaining to slippery conditions are also involved, such as at traffic light crossings, the glass top layer 172 is textured to resist slipping. In applications that do not require a top layer of glass 172, such as embedded lighting for patios or driveway brick, a special clear potting material 108 formulated to have a hard top surface 115 is used. Color pigments can be added to the clear potting material 108 to increase the spectrum of colors; emitted by the embedded LED lighting units 100, and also to make visable the unit 100 when the lighting is off.

FIG. 3 is a side view of one embodiment of two connected embedable LED lighting units 100a,100b. The conductive bus bars 106 of the two embedable LED lighting units 100a,100b are connected by a flexible, corrosion resistant cable 110 using mounting screws or bolts 112. In the event the embedded LED lighting 100 is damaged, the embedded LED lighting 100 is serviced by replacing the damaged section using the removable flexible bus bar connectors 106. The flexible, corrosion resistant bus bar connectors 106 allow for environmental expansion and contraction. Once the embedable LED lighting units 100 are in place, the connection point 150 between the embedded LED lighting units 100 is filled with a removable siliconized material that is used to prevent water puddles from making contact with the bus bar connectors 106.

Another wiring connecting method for independent light strips 100 for independent light flashing configurations is a cable with wiring attached to LEDs 102 and to a waterproof connector attached to the other end.

Figure 4:
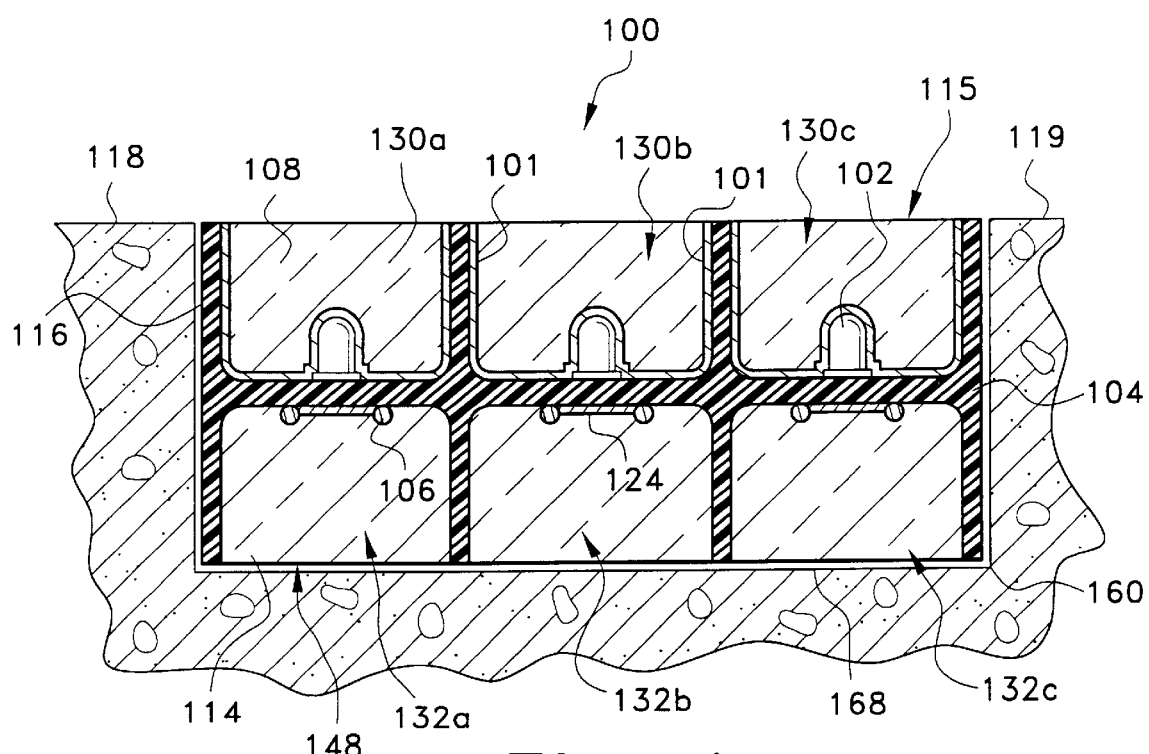
FIG. 4 is a cross-sectional view of embedable LED lighting unit embedded in concrete.

FIG. 4 is a cross-sectional view of the embedable LED lighting unit 100 embedded in concrete 118. In a preferred embodiment, the embedable LED light 100 is installed using a conventional diamond saw to cut concrete or asphalt 118 for a flush surface 119 for the LED lighting placement. For special curves such as alphanumeric and logo configurations, a mold is used with new concrete or asphalt 118 for the preparation of the embedable LED lighting 100. The LED lighting 100 is placed into the concrete cavity 160 with anchors (not shown) and/or an adhesive 116. The adhesive 116 helps to prevent water from entering between the base 148 of the LED lighting unit 100 and the bottom 168 of the concrete cavity 160, thus preventing heaving from the formation of ice.

The embedded LED lighting unit 100 depicted in FIG. 4 has multiple upper channels 130a,130b,130c, each with its own strip of light emitting diodes 102 and multiple lower channels 132a,132b,132c, each with its own printed circuit board 124 and conductive bus bars 106. The unit defined in FIG. 4 may be formed by joining the flanges of adjacent I-beams together, or by forming a single I-beam with multiple flanges or dividing walls in one piece to define the multiple upper 130a, 130b, 130c and lower 132a, 132b, 132c channels. In an alternate embodiment, a single large lower channel 132 containing multiple printed circuit boards 124 and conductive bus bars 106 is used instead of multiple lower channels 132a,132b,132c.

In a preferred embodiment, the embedded LED lighting units 100 are powered by a 5 volt power supply, however, power supplies supplying voltages in the range from 2 volts to 110 volts can be used. The exact power supply requirements are determined by the application.

Figure 5:
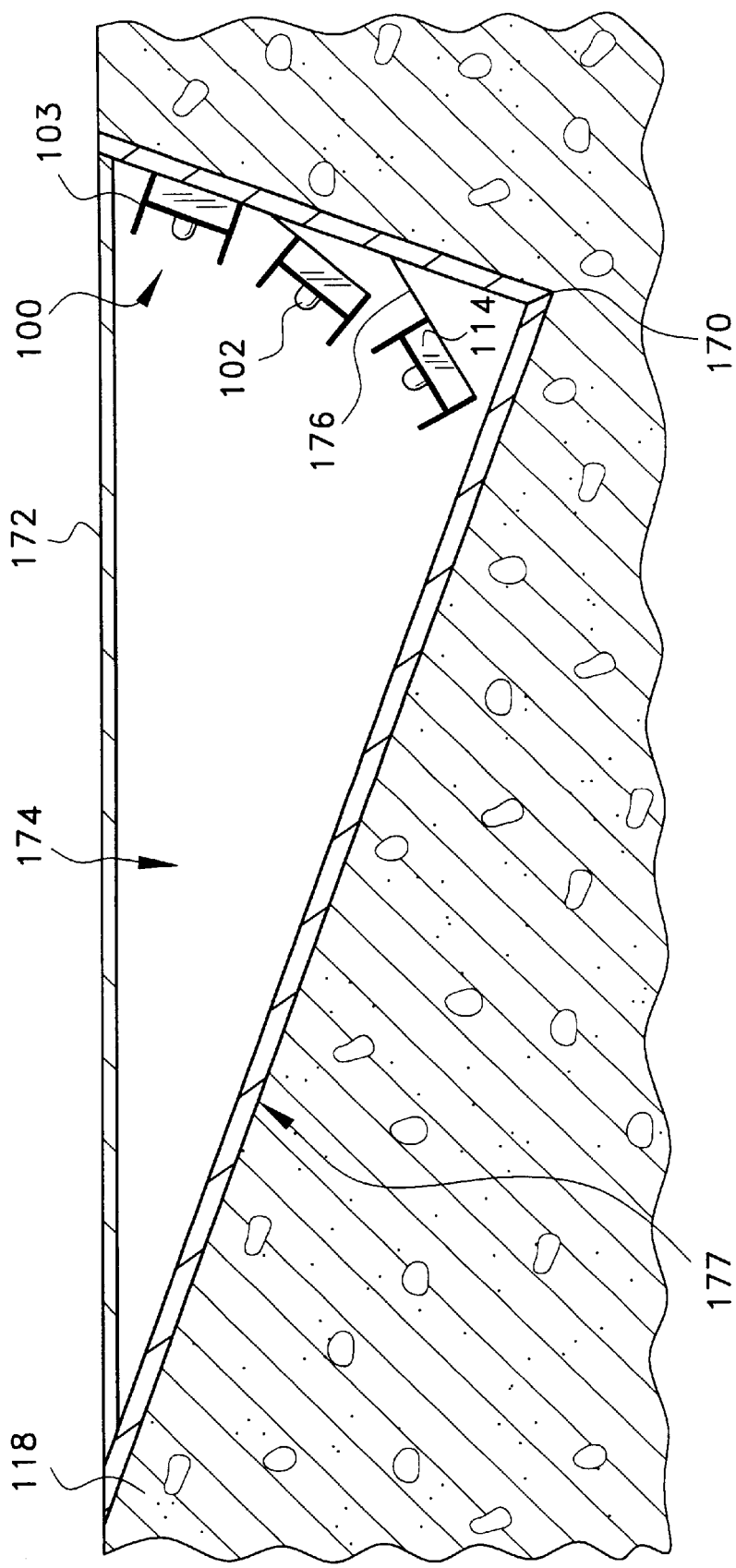
FIG. 5 is a side view of a cluster of embedable LED lighting units embedded within an angled opening in concrete.

FIG. 5 is a side view of a cluster of embedable LED lighting units 100 embedded within an angled opening 170 in concrete 118. In some applications such as a stop line before an aircraft runway that is used during the daytime, the lighting needs to be brighter to be readily visible during the daytime. In this situation, the clear potting material 108 and the reflective coating 101 are not deposited between the glass covering 172 and the LED units 100; therefore, a vacuum sealed air gap 174 exists between the tempered glass covering 172 and the LED units 100. The tempered glass cover 172 functions as a lens. In an alternate embodiment, a polymeric material is used instead of tempered glass in the covering 172 over the angled opening 170 in the concrete 118. The individual LED lighting units 100 are held in the place within the housing enclosure 177 using any suitable attachment means 176 that securely holds the lighting units 100 in place.

In the embodiment depicted in FIG. 5, the absence of the clear potting material 108 and the reflective coating 101 between the glass 172 and the LEDs 102 allows the cone of light on the head of the LED 102 to emit a brighter and more highly visible light, however, the view angle of the light emitted by LEDs 102 is reduced to the front of the LEDs 102. Therefore, to correct or increase the view angle, several clusters of LEDs 102 set at different angles are disposed within the housing enclosure 177 as shown in FIG. 5. This angular arrangement of LED clusters 102 makes the lighting viewable to pilots of small commuter aircraft or large passenger aircraft 120. The lens material or glass 172 in this application is constructed to support the weight of the aircraft 120.

The novel and innovative embedable LED lighting system of the present invention can be used in a wide range of applications, for example, for marking transportation, industrial, safety, or security areas. For example, a particular application could make use of bi-color light emitting diodes or two different color light emitting diodes to change the lighting color from green to red. Any bi-color LED combination could be derived based upon the available LED colors. Furthermore, separate LED color runs (linear arrangement of embedded LED lighting units) can be used in parallel, for example, a linear arrangement of green LEDs adjacent to a linear arrangement of red LEDs.

The embedded LED lighting units of the present invention can be used by the advertisement industry to display graphics and logos using different configurations and arrangements of LEDs. Embedded lighting can be used by the ceramic flooring industry to produce decorative patterns. Surface mounted LEDs can be used to make any decorative arrangement. The landscaping industry can use embedded lighting to enhance the appearance of landscape. The decorative LED lighting units can be embedded in the soil and in patio or driveway bricks.

The clear and reflective potting or lens material of the present invention is very serviceable. Abrasion of the lens material due to years of exposure to sand, gravel, and vehicle travel can be readily removed by sandblasting and resurfacing the potting material to give it a brand new appearance. A heated cable can be installed beneath the embedded LED lighting units to prevent ice and snow buildup during winter conditions.

The preferred embodiments of the present invention disclosed herein are intended to be illustrative only and are not intended to limit the scope of the invention. It should be understood by those skilled in the art that various modifications and adaptations of the present invention as well as alternative embodiments of the present invention may be contemplated.

It is to be understood that the present invention is not limited to the sole embodiments described above, but encompasses any and all embodiments within the scope of the following claims.

I claim:

1. An embedable LED lighting system adapted to be embedded in a surface, the system comprising:

a housing including an I-beam configuration dimensioned and configured to accommodate differing, predetermined mounting configurations, and made up of a web and parallel flanges defining an upper channel and a lower channel, the web having a plurality of holes defined therein;

a plurality of light emitting diodes extending through the holes defined in the web so that the diode lenses are disposed in the upper channel;

a printed circuit board having associated electrical circuitry and conductive bus bars attached thereto disposed in the lower channel, said plurality of light emitting diodes being connected to the printed circuit board, said diodes, said circuitry, and said bus bars being electrically connected; and a potting material disposed in said upper channel encasing said diodes, and in said lower channel encasing said circuitry and said bus bars.

2. The embedable LED lighting system according to claim 1, wherein said potting material is selected from the group consisting of clear, reflective and colored.

3. The embedable LED lighting system according to claim 1, wherein said lighting system is configured to match required federal, state and safety markings size and colors.

4. The embedable LED lighting system according to claim 1, further including a reflective means in said upper channel, said potting material being disposed over the reflective means.

5. The embedable LED lighting system according to claim 1, wherein said I-beam is made of an extruded material.

6. An embedded lighting system, comprising:

a housing including at least one I-beam and having at least one web and a plurality of parallel flanges defining multiple upper channel and lower channels, the at least one web having a plurality of holes defined therein;

a plurality of light emitting diodes extending through the holes defined in the at least one web so that the diode lenses are disposed in the upper channels;

printed circuit boards having associated electrical circuitry and conductive bus bars attached thereto disposed in the lower channels, said plurality of light emitting diodes being connected to the printed circuit boards, said diodes, said circuitry, and said bus bars being electrically connected; and a potting material disposed in said upper channels encasing said diodes and in said lower channels encasing said circuitry and said bus bars.

7. The embedded lighting system according to claim 6, further comprising means for heating said lighting system, in order to prevent snow and ice buildup thereupon.

8. The embedded lighting system according to claim 6, wherein said potting material is selected from the group consisting of clear, reflective and colored.

9. The embedded lighting system according to claim 6, further including a reflective means in said upper channel, said potting material being disposed over the reflective means.

10. The embedded LED lighting system according to claim 6, wherein said at least one I-beam is made of an extruded material.

11. An embedded LED lighting system, comprising:

a cluster of lighting units disposed at different angles within a cavity, each said lighting unit comprising a housing including an I-beam having a web and parallel flanges defining an upper channel and a lower channel, the web having a plurality of holes defined therein;

a plurality of light emitting diodes extending through the holes defined in the web so that the diode lenses are disposed in the upper channel;

a printed circuit board having associated electrical circuitry and conductive bus bars attached thereto disposed in the lower channel, said plurality of light emitting diodes being connected to the printed circuit board, said diodes, said circuitry, and said bus bars being electrical connected; and a potting material disposed in said upper channel surrounding said diodes, and in said lower channel encasing said circuitry and said bus bars.

12. The embedded LED lighting system according to claim 11, wherein said potting material is selected from the group consisting of clear, reflective and colored.

13. The embedded LED lighting system according to claim 11, wherein each said I-beam is made of an extruded material.

14. The embedded LED lighting system according to claim 11, wherein said cavity is air vacuum sealed.

15. The embedded LED lighting system according to claim 11, further comprising a tempered glass cover, for enclosing the cavity.

16. The embedded LED lighting system according to claim 11, further comprising a polymeric material covering, for enclosing the cavity.

* * * * *